United States Patent [19]

Kalt et al.

[11] Patent Number: 5,251,816
[45] Date of Patent: Oct. 12, 1993

[54] HEATING INSTALLATION

[75] Inventors: Hans-Peter Kalt, Schönaich; Michael Lüders, Gäufelden; Markus Mattedi, Walddorfhäslach, all of Fed. Rep. of Germany

[73] Assignee: Mercedes-Benz AG, Fed. Rep. of Germany

[21] Appl. No.: 922,415

[22] Filed: Jul. 31, 1992

[30] Foreign Application Priority Data

Jul. 31, 1991 [DE] Fed. Rep. of Germany ....... 4125286

[51] Int. Cl.$^5$ .............................................. B60H 1/02
[52] U.S. Cl. ................................... 237/12.3 B; 165/41
[58] Field of Search ..................... 237/12.3 A, 12.3 B, 237/12.3 C, 2 A, 12.3 R; 165/41

[56] References Cited

U.S. PATENT DOCUMENTS

| 1,951,521 | 3/1934 | Mussey. | |
|---|---|---|---|
| 1,981,011 | 11/1934 | Vernet | 237/12.3 B |
| 2,026,425 | 12/1935 | Hynes | 237/12.3 B |
| 5,025,985 | 6/1991 | Enander | 237/12.3 B X |

FOREIGN PATENT DOCUMENTS

| 0350896 | 1/1990 | European Pat. Off. . |
| 3104069 | 5/1984 | Fed. Rep. of Germany . |
| 3941696 | 3/1991 | Fed. Rep. of Germany . |
| 4024004 | 6/1991 | Fed. Rep. of Germany . |

Primary Examiner—Henry A. Bennet
Attorney, Agent, or Firm—Evenson, McKeown, Edwards & Lenahan

[57] ABSTRACT

The invention relates to a heating installation for the passenger compartment of omnibuses, comprising radiant heating elements which are disposed on the omnibus side walls under the side windows. In order to accommodate in a space-saving manner the hot-water carrying heating pipes supplying the radiant heating elements with thermal energy, the upper wall surface of the radiant heating elements which faces the passenger compartment is formed by a continuous interior cladding bearer of the respective omnibus side wall and the interior cladding bearer is formed in the armrest region of the passenger seats into a longitudinally continuous arm support. The heating pipe is laid in the cavity formed by this construction.

24 Claims, 3 Drawing Sheets

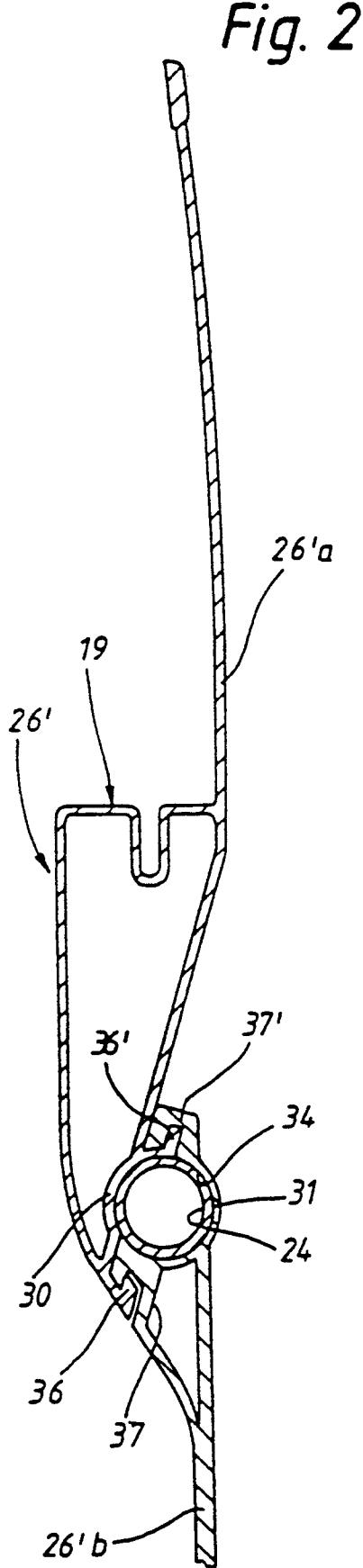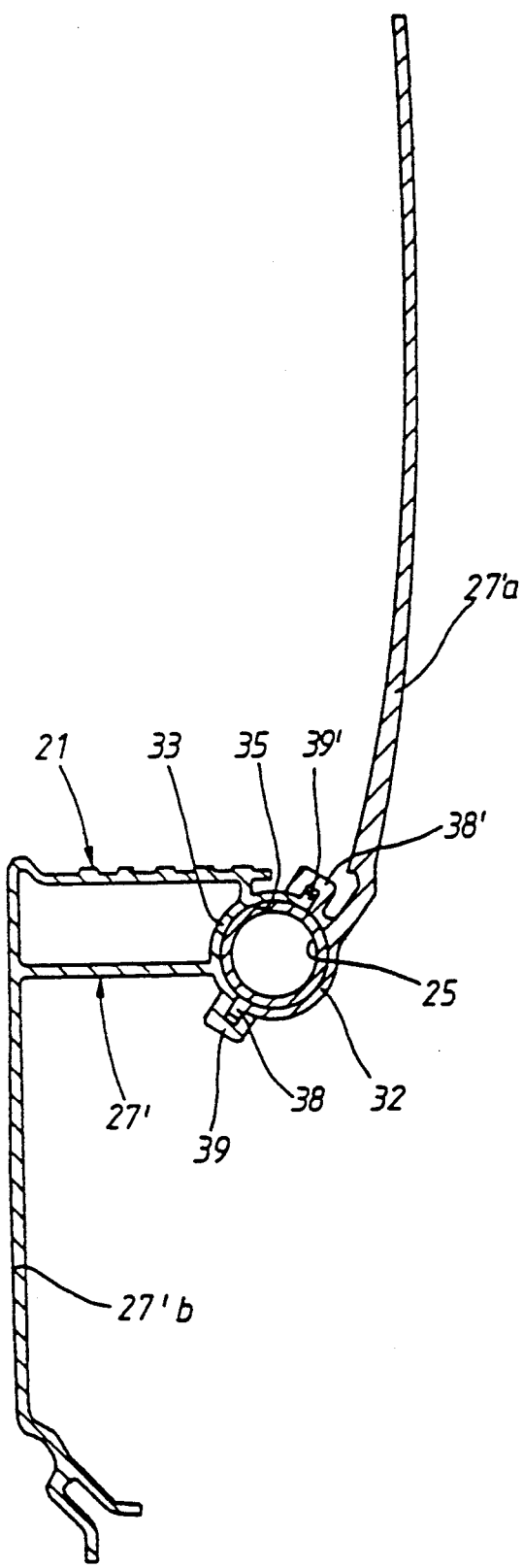

HEATING INSTALLATION

BACKGROUND AND SUMMARY OF THE INVENTION

The invention relates to a heating installation for the passenger compartment of omnibuses, in which radiant heating elements (frequently, so-called heat exchanger tubes) distribute over a large area the heat produced by externally heated heating pipes, and radiate it through such pipes.

A heating installation of this generic kind, with radiant heating elements working on the heat exchanger tube principle, is disclosed in DE 31 04 062 C2. Efficient radiant heating elements working on this principle, however, generally use ammonia or CFC as a heat transfer medium. Because these particular substances are not without problems in respect of operation and waste disposal, there has been an increasing tendency to effect the transmission of heat solely by heat conduction.

In buses it is expedient to heat the heating pipes with the hot cooling water made available by the engine. Since these heating pipes must have at least a certain minimum cross section, the space required for their installation is frequently difficult to accommodate in the bus body, especially where several such pipes are required for each radiant heating element in order to transmit adequate heating energy.

The object of the invention, therefore, is to provide a heating installation of the type first mentioned above in which the heating pipes are accommodated in a space-saving manner on the side walls of the bus without reducing the size of the passenger space.

This and other objects and advantages are achieved according to the invention, in which a continuous interior cladding bearer forms the upper wall surface of the radiant heating elements, and provides a cavity in the form of a longitudinally continuous arm support, in which at least one heating pipe can be laid. Because of this arm support which is thus formed on the side wall of the bus, it is possible to omit the armrest on the wall side of the outer passenger seats, so that no additional space is taken up by the arm support. The space available for the passenger in the bus remains unchanged.

In a preferred embodiment of the invention an additional inter cladding bearer, forming the lower wall surface of the radiant heating elements, is also formed in the foot region of the passenger seats, providing a longitudinally continuous footrest, which is so shaped that an additional heating pipe can be integrated into the resulting cavity. Two pipes carrying hot water can thus be accommodated in a space-saving manner in the side wall of the bus, thus providing adequate capacity for the transmission of the necessary thermal energy to the radiant heating elements.

Other objects, advantages and novel features of the present invention will become apparent from the following detailed description of the invention when considered in conjunction with the accompanying drawings.

BRIEF DESCRIPTION OF THE DRAWINGS

FIGS. 2 and 3 are cross-sectional views of part of an interior cladding bearer of a bus side wall according to another exemplary embodiment, namely in the region of the arm support (FIG. 2) and in the region of the footrest (FIG. 3) for the passenger compartment.

DETAILED DESCRIPTION OF THE DRAWINGS

Figure 1:
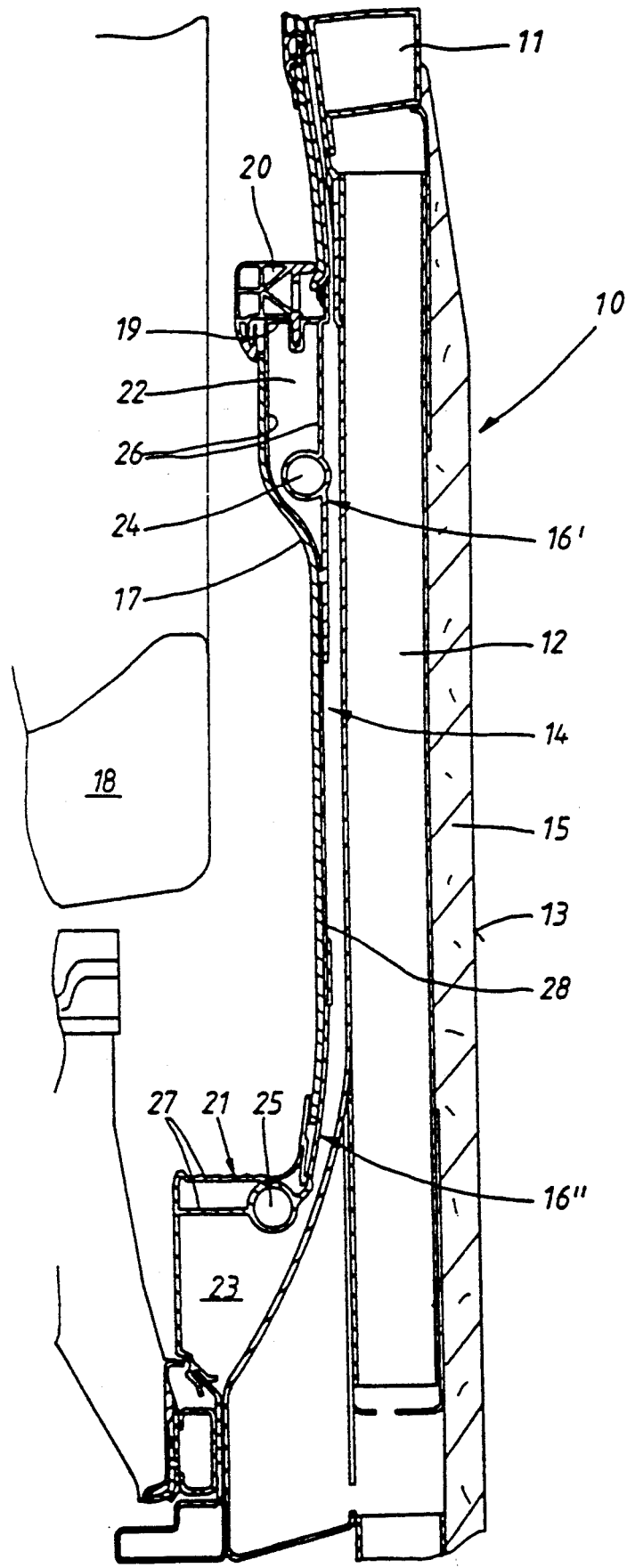
FIG. 1 is a cross-section of part of a side wall of a bus, with integrated radiant heating elements.

In the bus side wall 10 shown in cross-section in FIG. 1, a longitudinal member 11, which extends under the side windows (not visible here), and vertical cross-members 12 provide a rib-like stiffening of the side wall 10, which is covered with exterior cladding 13.

On the inside of the bus side wall 10 radiant heating elements 14, which are thermally insulated on the rear side and extended up to the longitudinal member 11, are disposed side by side, with clearance, in front of the cross-member 12 and the exterior cladding 13, which on the inside is provided with thermal insulation 15. An upper wall portion of the radiant heating elements 14, which faces the passenger compartment and is made of aluminum, forms an interior cladding bearer 16' which extends up to the longitudinal member 11. Reference numeral 17 designates the interior wall cladding, while reference numeral 18 designates part of a passenger seat. On all the passenger seats 18 installed one behind the other directly against the side wall 10 the armrest ordinarily provided on the side wall side is omitted and replaced by a longitudinally continuous arm support 19 formed on the interior cladding bearer 16' in the armrest region of the passenger seats 18. The surface of the arm support 19 is covered, at least in the arm region of the occupant of the passenger seat, with padding 20.

In the foot region of the passenger seats 18 another interior cladding bearer 16" is formed into a longitudinally continuous footrest 21 having a horizontally disposed support surface The interior cladding bearer 16' is formed by a bottom portion, made of aluminum, of the wall of the radiant heating elements 14. The thermal energy supplied to the two interior cladding bearers 16', 16" is radiated over a large area. Cavities 22, 23, which are formed by constructing the interior cladding bearers 16' and 16" as the arm support 19 and footrest 21 respectively, contain longitudinally continuous heating pipes 24, 25 which are connected to the cooling circuit of the bus engine and are supplied with water heated by the engine.

As can be seen in FIG. 1, the interior cladding bearers 16' and 16" consist of longitudinally continuous extruded sections, namely an upper extruded section 26 in the armrest region, and a lower extruded section 27 in the footrest region. A middle section, 28 which serves as a heat bridge and connects together the two extruded sections 26, 27, enlarges the surface of the radiant heating elements 14 which give up heat. The upper extruded section 26, the middle section portion 28 and the lower extruded section 27 are covered by the interior cladding 17 as far as the horizontal foot support surface of the footrest 21. As can be seen in FIG. 1, the heating pipe 24 is in each case formed integrally with the upper extruded section 26 and the heating pipe 25 is formed integrally with the lower extruded section 27. Instead of the integral construction, the heating pipes 24, 25 can also be produced separately and be joined to the extruded sections 26, 27 with a thermally conductive connection.

The upper and lower extruded sections 26, 27 may also be constructed in the manner illustrated in FIG. 2 and in FIG. 3. The two extruded sections 26' and 27' shown there are each subdivided into two part-sections 26'a, 26'b and 27'a, 27'b respectively. In the region of the separation points there are formed on each part-section 26'a, 26'b, 27'a, 27'b respective receptacle shells 30, 31, 32, 33 which, when the part-sections 26'a, 26'b and 27'a, 27'b respectively are hung one in the other, lie one on the other with oppositely directed curvatures and enclose a circular cylindrical cavity 34 and 35 respectively. Section flanges 36, 36', 37, 37' and 38, 38', 39, 39' respectively are provided on the receptacle shells 30, 31 and 32, 33 of the part-sections 26'a, 26'b and 27'a, 27'b, associated with one another. These section flanges interengage positively when the part-sections 26'a, 26'b and 27'a, 27'b respectively are hung one in the other.

The heating pipes 24, 25, which are preferably made of copper and have an outside diameter smaller than the inside diameter of the cavities 34, 35, are then inserted into the cavities 34, 35, whereupon the heating pipes 24, 25 are plastically widened by means of so-called domes. The part-sections 26'a, 26'b and 27'a, 27'b respectively are thus resiliently stressed and therefore inseparably joined together. An assembly method of this kind for producing load-bearing wall parts, such as for example loadable tailboards, is known per se. The plastic widening of the heating pipes 24, 25 also produces at the same time good heat transfer from the heating pipe 24 or to the extruded section 26'or 27', and thus to the interior cladding bearers 16'and 16". Thermally conductive coupling of the heating pipes 24, 25 to the extruded sections 26', 27' is also possible by means of spot welding or so-called rolling. When seals are used between the section flanges 36–39, the cavities 34, 35 can themselves take over the function of the water-carrying heating pipes 24, 25, so that the additional heating pipes 24, 25 made of copper can be dispensed with. The two extruded sections 26', 27' shown in FIGS. 2 and 3 are connected together, in the same way as is illustrated in FIG. 1, by the middle section portion 28 forming a heat bridge.

Figure 4:
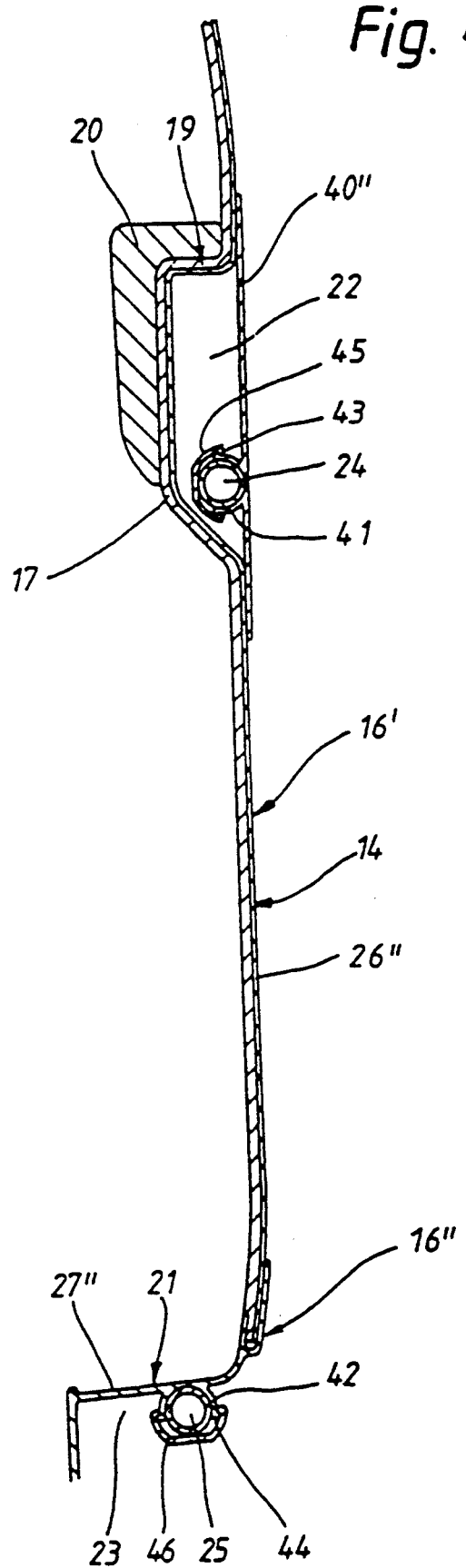
FIG. 4 shows a cross-section of part of the interior cladding bearer of a bus side wall according to a third exemplary embodiment.

The modified radiant heating element 14, of which part is shown in FIG. 4, is composed of a lower extruded section 27", which forms the interior cladding bearer 16", and an upper extruded section 26" which directly adjoins the section 27" and constitutes the interior cladding bearer 16'. The middle section portion is eliminated. Another extruded section 40", which is in the form of a bearer for the upper heating pipe 24, is fastened to the upper extruded section 26" in such a manner that the heating pipe 24 once again lies in the cavity 22 formed by the construction of the arm support 19. The extruded section 40" and the extruded section 27" both carry respective semicircular cylindrical receptacle shells 41 and 42 formed integrally with the extruded section 27" or 40". Each receptacle shell 41, 42 carries diametrically opposed, radially projecting clamp webs 43 and 44 respectively. The heating pipes 24, 25, which are likewise made of copper are received positively in the receptacle shells 41, 42 and by means of spring clips 45, 46 engaging behind the clamp webs 43, 44 are not only fastened in the receptacle shells 41, 42 but also coupled with a good thermally conductive connection to the receptacle shells 41, 42. The extruded section 26" is covered by the interior wall cladding 17.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Heating installation for the passenger compartment of a bus, comprising:

radiant heating elements which are disposed on side walls under side windows of the bus; and hot-water-carrying heating pipes which extend longitudinally continuously along the bus side walls and are coupled with a thermally conductive connection to said radiant heating elements;

said radiant heating elements having an upper wall surface which faces the passenger compartment and is formed by a continuous interior cladding bearer of the bus side wall;

said interior cladding bearer being formed in the armrest region of the passenger seats into a longitudinally continuous arm support; and said heating pipe being arranged in the cavity of the arm support.

2. Installation according to claim 1, wherein an additional interior cladding bearer, forming a lower wall surface of the radiant heating elements is associated with the interior cladding bearer constituting the upper wall surface of the radiant heating elements and is formed into a longitudinally continuous footrest, and wherein an additional heating pipe is arranged in the cavity of the footrest.

3. Installation according to claim 2, wherein the two interior cladding bearers are connected by a section forming a heat bridge.

4. Installation according to claim 1, wherein the interior cladding bearers are composed of longitudinally continuous extruded sections.

5. Installation according to claim 2, wherein the interior cladding bearers are composed of longitudinally continuous extruded sections.

6. Installation according to claim 3, wherein the interior cladding bearers are composed of longitudinally continuous extruded sections.

7. Installation according to claim 4, wherein the heating pipes are formed integrally with the extruded sections.

8. Installation according to claim 4, further comprising longitudinally continuous semicircular cylindrical receptacle shells having diametrically opposed radially projecting clamp webs wherein said receptacle shells are formed integrally with the extruded sections and wherein the heating pipes are received positively in a respective one of the receptacle shells and are coupled thereto with a thermally conductive connection by means of spring clips engaging behind the clamp webs.

9. Installation according to claim 5, further comprising longitudinally continuous semicircular cylindrical receptacle shells having diametrically opposed radially projecting clamp webs, wherein said receptacle shells are formed integrally with the extruded sections and wherein the heating pipes are received positively in a respective one of the receptacle shells and are coupled thereto with a thermally conductive connection by means of spring clips engaging behind the clamp webs.

10. Installation according to claim 6, further comprising longitudinally continuous semicircular cylindrical receptacle shells having diametrically opposed radially projecting clamp webs, wherein said receptacle shells are formed integrally with the extruded sections and wherein the heating pipes are received positively in a respective one of the receptacle shells and are coupled thereto with a thermally conductive connection by means of spring clips engaging behind the clamp webs.

11. Installation according to claim 4, wherein said heating pipes are made of copper.

12. Installation according to claim 4, wherein separation points of the extruded sections are situated in the region of the heating pipes, wherein the extruded sections each carry in a separation region a longitudinally continuous receptacle shell, and wherein the receptacle shells are so shaped that, when the extruded sections are hung one in the other, they lie one on the other with oppositely directed curvatures and form a circular cylindrical cavity for the reception of heating pipe or themselves form the heating pipe.

13. Installation according to claim 5, wherein separation points of the extruded sections are situated in the region of the heating pipes, wherein the extruded sections each carry in a separation region a longitudinally continuous receptacle shell, and wherein the receptacle shells are so shaped that, when the extruded sections are hung one in the other, they lie one on the other with oppositely directed curvatures and form a circular cylindrical cavity for the reception of a heating pipe or themselves form the heating pipe.

14. Installation according to claim 6, wherein separation points of the extruded sections are situated in the region of the heating pipes, wherein the extruded sections each carry in a separation region a longitudinally continuous receptacle shell, and wherein the receptacle shells are so shaped that, when the extruded sections are hung one in the other, they lie one on the other with oppositely directed curvatures and form a circular cylindrical cavity for the reception of a heating pipe or themselves form the heating pipe.

15. Installation according to claim 12, wherein a heating pipes inserted into the circular cylindrical cavity and is coupled with a thermally conductive connection, to the extruded sections by one of mechanical pressing, rolling and spot welding.

16. Installation according to claim 13, wherein a heating pipe is inserted into the circular cylindrical cavity and is coupled with a thermally conductive connection, to the extruded sections by one of mechanical pressing, rolling and spot welding.

17. Installation according to claim 14, wherein a heating pipe is inserted into the circular cylindrical cavity and is coupled with a thermally conductive connection, to the extruded sections by one of mechanical pressing, rolling and spot welding.

18. Installation according to claim 1, wherein the longitudinally continuous arm support is provided in the arm region of the occupant of the passenger seat, and has a padded rest.

19. Installation according to claim 8, wherein the longitudinally continuous arm support is provided in the arm region of the occupant of the passenger seat, and has a padded rest.

20. Installation according to claim 12, wherein the longitudinally continuous arm support is provided in the arm region of the occupant of the passenger seat, and has a padded rest.

21. Installation according to claim 4, wherein the heating pipes are joined fast to the extruded sections.

22. Installation according to claim 4, further comprising longitudinally continuous semicircular cylindrical receptacle shells having diametrically opposed radially projecting clamp webs wherein said receptacle shells are joined fast to the extruded sections, and wherein the heating pipes are received positively in a respective one of the receptacle shells and are coupled thereto with a thermally conductive connection by means of spring clips engaging behind the clamp webs.

23. Installation according to claim 5, further comprising longitudinally continuous semicircular cylindrical receptacle shells having diametrically opposed radially projecting clamp webs, wherein said receptacle shells are joined fast to the extruded sections, and wherein the heating pipes are received positively in a respective one of the receptacle shells and are coupled thereto with a thermally conductive connection by means of spring clips engaging behind the clamp webs.

24. Installation according to claim 6, further comprising longitudinally continuous semicircular cylindrical receptacle shells having diametrically opposed radially projecting clamp webs, wherein said receptacle shells are joined fast to the extruded sections, and wherein the heating pipes are received positively in a respective one of the receptacle shells and are coupled thereto with a thermally conductive connection by means of spring clips engaging behind the clamp webs.

* * * * *